Patented Feb. 27, 1945

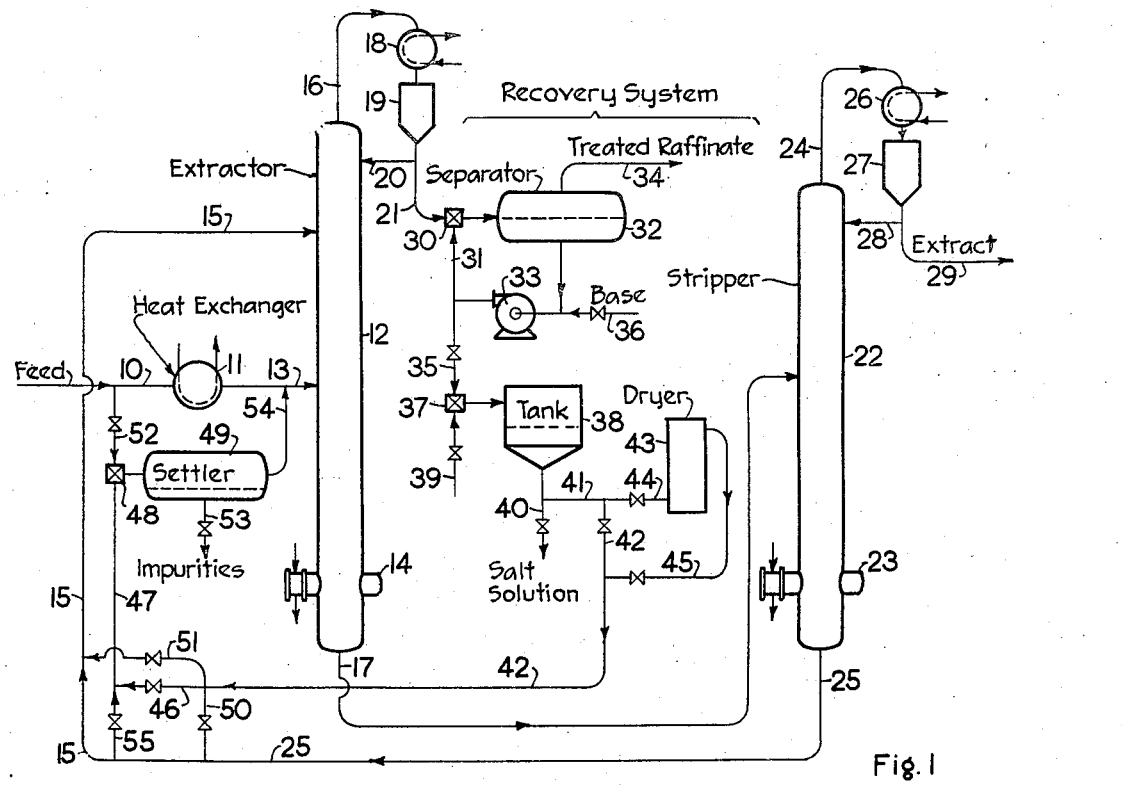
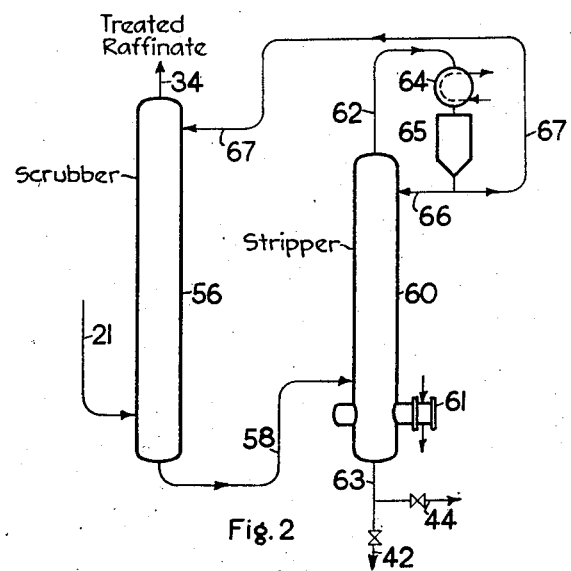

2,370,530

UNITED STATES PATENT OFFICE 2,370,530

METHOD OF SOLVENT RECOVERY IN VAPOR PHASE EXTRACTION PROCESSES

William P. Gage, Oakland, Calif., assignor to Shell Development Company, San Francisco, Calif., a corporation of Delaware Application September 29, 1942, Serial No. 460,176

11 Claims. (Cl. 196—13)

This invention relates to the recovery and purification of solvents employed in vapor phase extraction processes such as extractive distillation processes. More particularly, it deals with the continuous removal of impurities which accumulate in the solvent employed in such processes. Further, it embraces the recovery and purification, including dehydration, of small percentages of solvent which may escape with the raffinate from such processes.

The problem of separating liquefiable vapor mixtures whose components boil in a narrow temperature range is a common one in the chemical industry. One method of solving this problem is to contact the mixture in the vapor phase or state with a regenerable selective solvent in order to remove one of the components of the mixture. In the past the efficiency of the vapor phase extraction processes has been hampered by the accumulation of impurities in the solvent in the course of its use. Impurities thus accumulated may cause corrosion or erosion and may have other harmful effects. Water, for instance, may cause corrosion; solids cause erosion; resinous materials may cause emulsions and/or foaming troubles, etc. Another difficult problem has been the economical recovery of small percentages of solvent which may escape with the raffinate.

It is a purpose of this invention to increase the economy and efficiency of vapor phase extraction processes by increasing the life of the solvent employed. Another purpose is to continuously purify at least a portion of the solvent circulated. A further purpose is to recover and purify the small percentages of the solvent which may escape with the raffinate.

According to this invention a mixture to be separated is contacted in the vapor state in an extraction with a liquid selective solvent having preferential solvent power for a portion of said mixture to produce an extract phase comprising the major portion of said solvent and containing the soluble or extracted portion of the mixture; and a raffinate phase or vapor which comprises the remainder of the mixture and may contain a small percentage of the solvent. The fat solution is distilled to vaporize the dissolved portion of the mixture and to produce a lean residual solvent. The raffinate vapor is condensed and if it contains selective solvent it is preferably extracted with an aqueous solvent to recover said selective solvent. The latter is recovered from the raffinate and/or a portion of said residual lean solvent and is then contacted with an amount of the original mixture in the liquid state under conditions to dissolve the selective solvent in the mixture. This produces two layers at least one of which is a liquid and consists essentially of said amount of mixture and the dissolved selective solvent; and the other layer, which may be liquid or solid and contains, for instance, water, accumulated impurities, etc. The two layers are separated, and the layer containing the selective solvent is introduced into a vapor phase extractor. The other phase may be disposed of to suit convenience.

The principle of this invention may be incorporated into many forms and modifications. However, it may be more clearly described by reference to a particular form such as that shown in the accompanying illustrative drawing.

Figure I is a flow diagram of the process as applied to an extractive distillation process showing under the bracket a solvent recovery system employed for the recovery of an acidic (or basic) solvent from the raffinate. Figure II is a flow diagram of a recovery system for a neutral solvent in an extractive distillation process substituting that part of Figure I shown under the bracket.

For simplicity, the description of the flow diagram shown in Figure I is limited to a representative process wherein toluene is extracted from a suitable gasoline fraction by means of a phenol-cresol solvent which is an acidic selective solvent for the toluene.

The gasoline fraction containing the toluene to be extracted passes through feed line 10 and heat exchanger 11 and thence to extractor or extraction column 12 through inlet line 13. In the extractor 12 which is provided with a reboiler 14 at its bottom, the feed is contacted with a lean solvent introduced through feed line 15 in the upper portion of the extractor above line 13. In this extraction there are produced raffinate vapors which are withdrawn through vapor outlet line 16 at the top of the column and an extract comprising said solvent and toluene withdrawn through bottom line 17. The raffinate vapors are condensed in condenser 18 and the condensate is collected in accumulator 19 whence a portion is recycled to the top of extractor 12 through line 20, and the remainder is withdrawn through line 21.

The extract from extractor 12 is conveyed from the bottom line 17 into stripper 22, which is provided with reboiler 23 at its bottom. In this stripper the extract is stripped of the toluene vapors to produce a lean residual solvent withdrawn through bottom line 25, which line connects with line 15 returning the lean residual solvent to extractor 12. The toluene vapors are withdrawn from the stripper 22 through line 24 and condensed in condenser 26, and the condensate is collected in accumulator 27 whence reflux is returned to the top of the stripper 22 through line 28, the remainder of the toluene going through line 29 to storage not shown.

Usually a small portion of the phenolic solvent, normally amounting to between about .005 and .35% by weight of the raffinate, is carried over with the raffinate vapors from extractor 12. Unless recovered, this small percentage of solvent constitutes an undesirable impurity in the raffinate and over a long period of time its loss becomes a considerable item of expense.

The recovery of the solvent from the raffinate is accomplished in the recovery system shown below the bracket in Figure I. The solvent-contaminated raffinate flowing through line 21 first passes into mixer 30, where it is mixed with a small portion of an aqueous strong base such as an aqueous solution of sodium hydroxide introduced through line 31. This solvent-contaminated raffinate and base mixture is then passed into phase separator 32 where the base and solvent phase separates from the raffinate phase and the former is circulated by pump 33 to line 31 and mixer 30 until all the base is spent. The treated raffinate phase from which the solvent has been removed is withdrawn from the separator 32 through line 34. When the base in this system becomes spent with accumulated phenolic solvent it is withdrawn through valved line 35 and fresh base is introduced through valved line 36.

The spent base then enters an acidification system comprising mixer 37 and tank 38. Here, an acid strong enough to liberate the phenols, such as dilute sulfuric acid, hydrochloric acid, carbon dioxide, hydrogen sulfide, etc., is admitted into tank 38 through mixer 37 by means of valved line 39. Salt solution produced upon acidification of the base accumulates as a separate liquid phase in the bottom of tank 38 and is withdrawn through valved line 40. Liberated phenolic solvent is withdrawn from tank 38 through line 41 and may be returned directly to the main solvent system through valved line 42, or may be further purified by being introduced into dehydrator or drier 43 through valved line 44.

In drier 43 water which might be present in the recovered solvent is removed from the solvent. If water is retained in the solvent and returned to the system it will cause corrosion and erosion difficulties in the extractor and stripper. Drier 43 may be of the chemical type and may be filled with calcium chloride, sodium chloride, bauxite or the like, or may be a distillation tower. It has been found that a chemical drier has been satisfactorily employed in this system because the quantities of solvent to be handled are relatively small. Dehydrated solvent is withdrawn through valved line 45 to be returned to the main solvent system through line 42.

The solvent recovered from the raffinate phase may proceed from line 42 through valved line 50 or valved line 51 to join the lean residual solvent in lines 25 or 15, respectively; or the solvent from line 42 may pass directly through valved line 46 and line 47 to be purified.

Solvent containing accumulated impurities is purified by contacting the solvent with a portion of the hydrocarbon feed in line 10 bypassed through valved line 52 to join the solvent in mixer 48. This contact dissolves the solvent from its impurities to produce two phases or layers which may be separated in settler 49, or any other convenient apparatus such as a filter, centrifuge, or the like. The amount of hydrocarbon feed admitted to mixer 48 is sufficient to dissolve substantially all of the solvent introduced through line 47, leaving behind such impurities as are insoluble in the resulting solvent solution. The solvent layer consisting essentially of a mixture of purified solvent and feed is then returned to extractor 12 through lines 54 and 13, and the layer of insoluble impurities which separate in settler 49 are withdrawn through line 53. The removed impurities may comprise solid materials such as iron and other metal oxides, salts, resinous materials, etc.; and liquids such as water, aqueous solutions, etc. These impurities may have their origin in various portions of the system: oxides usually from corrosion of the reboiler and other heated parts in the system; salts and water may be carried over from tank 38, etc.

As already indicated, the amount of hydrocarbon feed admitted to mixer 48 is sufficient to dissolve substantially all of the solvent. A large excess over the minimum amount, however, serves no useful purpose. Normally the relative volumes of hydrocarbon feed and solvent in mixer 48 may vary between wide limits depending largely upon the miscibility of the solvent and the feed. Thus, the ratio of feed to solvent may vary between about 1:1 and 1:100. When using a high ratio, water may be eliminated inasmuch as water is precipitated from selective solvents by the presence of large percentages of hydrocarbon solvents.

A portion of the lean residual solvent in line 25 instead of flowing through line 15 may be bypassed through valved line 55 and line 47 to mixer 48 to be purified as described above. This purification of a portion of the lean solvent each time it is circulated continuously removes the contaminants and impurities which accumulate in it and thereby materially increases the life of the solvent, so that it does not have to be completely replaced nearly so often as when the impurities are permitted to accumulate and finally destroy the effectiveness of the solvent.

A modification of the process described above may involve the employment of a basic instead of an acidic solvent. The flow diagram shown in Figure I remains the same and the only changes required involve circulating an acid instead of a base in the circulating system comprising separator 32 and using a base instead of an acid to liberate the solvent in tank 38.

If a neutral solvent is employed in the described process a further modification for the recovery system is necessary, such as that shown in Fig. II. This system has connecting lines 21, 34, 42 and 44 identical to those of Figure I having the same reference characters. Solvent is removed from the raffinate by scrubbing the latter with an auxiliary liquid, which auxiliary liquid is capable of dissolving the selective solvent but is insoluble in the raffinate and preferably has a boiling temperature substantially lower than that of said selective solvent. The solvent-contaminated raffinate enters scrubber 56 through line 21 near its base, wherein it is contacted with the auxiliary liquid introduced through feed line 57 near its top. In the scrubber is produced a solvent-free raffinate, withdrawn through line 34 and a fat solution comprising said neutral solvent and auxiliary liquid, which fat solution is withdrawn through bottom line 58. The fat solution passes into stripper 60 provided with reboiler 61 wherein the auxiliary liquid is stripped from the dissolved neutral solvent, producing a substantially pure neutral solvent withdrawn through bottom line 63 and vapors of said auxiliary liquid withdrawn through bottom line 63 and vapors of said auxiliary liquid withdrawn through top line 62. Line 63 connects with lines 42 and 44, and the recovered solvent is further treated as described above. Vapor line 62 is connected to condenser 64 and accumulator 65, whence reflux is returned to the top of stripper 60 through line 66, the remainder passing through lines 67 and 57 to scrubber 56. Suitable auxiliary liquids comprise, for example, aqueous solutions of methyl or ethyl alcohol, acetone, dioxane, nitromethanes, acetonitriles; acetic, propionic and lactic acids; ethylene diamine, ethanolamines, propylene or butylene glycol, ethylene glycol methyl or ethyl ethers, etc.

It shall be understood that additional heat exchangers, valves, bypass lines, pumps, driers and other equipment may be interposed at one or several points so as to permit the exercise of the greatest economy and control of the system. The installation of such devices is considered to be within the skill of the ordinary plant designer acquainted with their operation.

Mixtures normally subjected to vapor phase extraction include those which are made up of components having narrow boiling ranges, or those components which form azeotropes. Such mixtures include hydrocarbon oils containing different types of hydrocarbons such as paraffins, olefins, diolefins, naphthenes and aromatics; for example, a gasoline distillate boiling from about 98–110° C. and containing toluene; mixtures of isomeric compounds such as xylenes and ethyl benzene; isomeric ethyl naphthalenes; mixtures of ethane, ethylene and/or acetylene; propane and propylene; butanes, butylenes and/or butadiene; pentadienes such as isoprene in fractions consisting essentially of hydrocarbons containing five carbon atoms; or the like. Vapor phase extraction processes are also employed in the dehydration of lower alcohols, ketones, and acetic acid; the separation of quinoline from isoquinoline; the separation of different types of alkyl phenols from each other and from hydrocarbon oil; the separation of petroleum nitrogen bases from each other and from a hydrocarbon oil; and the separation of products of oxidation of hydrocarbon oils from each other and from hydrocarbon oils.

There are many solvents which may be used in such processes; that is, solvents which have a preferential solvent power for one component of a mixture over that of the other. Solvents which may be used in the extraction of aromatic hydrocarbons from hydrocarbon oils are: phenol, cresylic acids, alkyl phenol mixtures, aniline, alkyl anilines, diphenyl amine, ditolyl amines, carbitols (diethylene glycol mono-ethers) such as methyl, ethyl, propyl carbitols; chlorinated dialkyl ethers such as beta-beta-dichlor ethyl ether; nitrobenzene, nitro-xylenes, naphthols, alkyl naphthols, benzo phenone, phenyl tolyl ketone, diphenylene ketone; alkyl phthalates, such as dimethyl phthalate; alkyl salicylates such as methyl salicylate; benzyl alcohol, benzyl chlorides, i. e., benzyl, benzol, benzo chlorides, benzonitrile, diphenyl oxide, ditolyl oxide, hydroxy pyridine, nitropyridine, chlorinated pyridines, quinoline, isoquinoline, chlorinated quinoline, hydroxy quinolines, 5-nitroquinoline, tetrahydrofurfuryl alcohol, furfural alcohol, furfural; the mono glycerol ethers such as 1-methoxy glycerol, 2-methoxy glycerol, 1-ethoxy glycerol, 2-ethoxy glycerol, 1-propoxy glycerol, 2-propoxy glycerol, 1-isopropoxy glycerol, 2-isopropoxy glycerol; the glycerol diethers such as 1,2-dimethoxy glycerol, 1,3-dimethoxy glycerol, 1,2-diethoxy glycerol, 1,3-diethoxy glycerol, 1,2-dipropoxy glycerol, 1,3-dipropoxy glycerol, 1,2-di-isopropoxy glycerol, and 1,3-di-isopropoxy glycerol; the mixed diglycerol ether esters such as 1-ethoxy-2-methoxy glycerol, 1-methoxy-3-propoxy glycerol, 1-ethoxy-2-isopropoxy glycerol, phenoxy alcohols, and the like.

Solvents which may be used for the separation of diolefins from olefins are nitromethane, nitroethane, nitropropane, nitrobenzene, furfural, acetone, methyl ethyl ketone, dioxane, acetonitrile, propionitrile, aliphatic amines, acetone, etc.

All the solvents may be classified into three general classes, namely: acidic, basic, and neutral. Different methods are employed as described in the recovery of each of these three different classes of solvents from the raffinate component of a mixture.

The pressures employed in such processes as are involved herein may vary within reasonable limits. However, vacuum or superatmospheric pressures may be employed, although pressures close to atmospheric are usually most convenient.

The temperature ranges which might be employed in such processes are necessarily limited by the boiling temperatures of the ingredients employed in any one process as well as by the pressures under which that process is operated. However, under no circumstances is the temperature above the boiling temperature of the solvent at the pressure of the system.

The described process may be either intermittent or continuous. Any apparatus may be employed in the process which is of conventional and convenient design or structure and which will safely permit the use of the pressures, temperatures, rates of flow, and the individual corrosive ingredients necessary for effecting the process. Under most conditions, however, ordinary steel equipment is satisfactory.

I claim as my invention:

1. In a process for the separation of a liquefiable vapor mixture into two components wherein said vapor mixture is contacted in an extractor with a liquid selective solvent for one of said components to produce an extract phase and a raffinate phase, at least one of which contains solvent, and wherein impurities accumulate in said solvent, the steps comprising recovering said solvent from at least one of said phases containing it, circulating to said extractor for further contact with more of said mixture the recovered solvent composed predominantly of solvent and containing said impurities, purifying at least a portion of the circulating stream of recovered solvent by contact with an amount of said mixture while the latter is in the liquid state sufficient to dissolve said part and to produce two layers, one of which is a solvent layer consisting essentially of said solvent and the mixture, and the other of which consists essentially of accumulated impurities insoluble in said mixture, separating said layers, and introducing the solvent layer into said extractor.

2. The process of claim 1 wherein said mixture is a gasoline fraction containing toluene and said solvent is a phenol-cresol solvent for said toluene.

3. The process of claim 1 wherein said impurities are solids.

4. The process of claim 1 wherein said solvent is an anhydrous liquid selective solvent.

5. The process of claim 1 wherein said solvent is an acidic selective solvent.

6. In a process for the separation of a liquefiable vapor mixture into two components wherein said vapor mixture is contacted in an extractor with liquid selective solvent for one of said components to produce an extract phase consisting essentially of the soluble component and the major portion of said solvent, and a raffinate phase consisting essentially of the other component and the remaining minor portion of said solvent, and wherein impurities accumulate in said solvent, the steps comprising recovering said solvent from each of said phases, circulating to said extractor for further contact with more of said mixture the recovered solvent composed predominantly of solvent and containing said impurities, purifying at least a part of the circulating stream of recovered solvent from said raffinate phase by contact with an amount of said mixture while the latter is in the liquid state sufficient to dissolve said part and to produce two layers, one of which is a solvent layer consisting essentially of said solvent and said mixture, and the other of which consists essentially of the accumulated impurities insoluble in said mixture, separating said layers and introducing the solvent layer into said extractor.

7. The process of claim 6 wherein the solvent recovered from said raffinate phase is dehydrated before contacting said mixture.

8. In a process for the separation of a liquefiable vapor mixture into two components wherein said vapor mixture is contacted in an extractor with liquid selective solvent for one of said component to produce an extract phase consisting essentially of the soluble component and the major portion of said solvent, and a raffinate phase consisting essentially of the other component and remaining minor portion of said solvent and wherein impurities accumulate in said solvent, the steps comprising recovering said solvent from each of said phases, circulating to said extractor for further contact with more of said mixture the recovered solvent composed predominantly of solvent and containing said impurities, purifying at least a part of the circulating stream of recovered solvent from said extract phase and all the recovered solvent from said raffinate phase by contact with an amount of said mixture while the latter is in the liquid state sufficient to dissolve said part and to produce two layers, one of which is a solvent layer and consists essentially of said solvent and said mixture, and the other of which consists essentially of said accumulated impurities insoluble in said mixture, separating said layers, and introducing the solvent layer into said extractor.

9. In a process for the separation of a liquefiable vapor mixture into two components wherein said vapor mixture is contacted in an extractor with liquid acidic selective solvent for one of said components to produce an extract phase consisting essentially of said soluble component and the major portion of said solvent, and a raffinate phase consisting essentially of the other component and the remaining minor portion of said solvent, and wherein solvent is separately recovered from each phase and further wherein impurities accumulate in said solvent, the improvement comprising extracting said acidic solvent from said raffinate phase by contacting with an aqueous solution of a base, liberating the extracted solvent from the resulting aqueous solution by acidifying the same with an acid stronger than said acidic solvent, circulating to said extractor for further contact with more of said mixture the recovered acidic solvent composed predominantly of solvent and containing said impurities contacting at least a part of the circulating acidic solvent from said raffinate phase with an amount of said mixture while the latter is in the liquid state sufficient to dissolve said part and to produce two layers, one of which is a solvent layer and consisting essentially of said acidic solvent and said mixture, and the other of which consists essentially of the accumulated impurities insoluble in said mixture, separating said layers, and introducing the solvent layer into said extractor.

10. In a process for the separation of a liquefiable vapor mixture into two components wherein said vapor mixture is contacted in an extractor with liquid basic selective solvent for one of said components to produce an extract phase consisting essentially of the soluble component and the major portion of said solvent, and a raffinate phase consisting essentially of the other component and the remaining minor portion of said solvent, and wherein solvent is separately recovered from each phase, and further wherein impurities accumulate in said solvent, the impovement comprising extracting said basic solvent from said raffinate phase by contacting with an aqueous solution of an acid, liberating the extracted solvent from the resulting aqueous solution by alkalizing same with a base stronger than said basic solvent, circulating to said extractor for further contact with more of said mixture the recovered basic solvent composed predominantly of solvent and containing said impurities, contacting at least a part of the circulating basic solvent from said raffinate phase with an amount of said mixture while the latter is in the liquid state sufficient to dissolve said part and to produce two layers, one of which is a solvent layer and consists essentially of said basic solvent and said mixture, and the other of which consists essentially of the accumulated impurities insoluble in said mixture, separating said layers, and introducing the solvent layer into said extractor.

11. In a process for the separation of a liquefiable vapor mixture into two components wherein said vapor mixture is contacted in an extractor with liquid neutral selective solvent for one of said components to produce an extract phase consisting essentially of the soluble component and the major portion of said solvent, and a raffinate phase consisting essentially of the other component and the remaining minor portion of said solvent, and wherein solvent is separately recovered from each phase, and further wherein impurities accumulate in said solvent, the improvement comprising scrubbing said neutral solvent with auxiliary liquid which liquid has a preferential solvent power for the neutral solvent and is immiscible with said raffinate, to produce a fat solution consisting essentially of said auxiliary liquid and said neutral solvent, stripping said fat solution to liberate said neutral solvent, circulating to said extractor for further contact with more of said mixture the recovered neutral solvent composed predominantly of solvent and containing said impurities, contacting at least a part of said circulating neutral solvent from said raffinate phase with an amount of said mixture while the latter is in the liquid state sufficient to dissolve said part and to produce two layers, one of which is a solvent layer and consists essentially of said neutral solvent and said mixture, and the other of which consists essentially of the accumulated impurities insoluble in said mixture, separating said layers, and introducing the solvent layer into said extractor.

WILLIAM P. GAGE.